Oct. 27, 1925. Re. 16,191

H. POVEY ET AL

MACHINE FOR DISINTEGRATING AND EMULSIFYING MATERIALS

Original Filed Aug. 3, 1923 3 Sheets-Sheet 1

INVENTOR
H. POVEY & H.O. HALLAS
BY John W. Thompson
their ATTORNEY

Oct. 27, 1925. Re. 16,191

H. POVEY ET AL

MACHINE FOR DISINTEGRATING AND EMULSIFYING MATERIALS

Original Filed Aug. 3, 1923 3 Sheets-Sheet 2

INVENTOR
H. POVEY & H.O. HALLAS
BY
John W. Thompson
their ATTORNEY

Oct. 27, 1925. H. POVEY ET AL Re. 16,191

MACHINE FOR DISINTEGRATING AND EMULSIFYING MATERIALS

Original Filed Aug. 3, 1923 3 Sheets-Sheet 3

INVENTORS.
H. POVEY & H. O. HALLAS
BY
J. Thurlow Thompson
Their ATTORNEY

Reissued Oct. 27, 1925.

Re. 16,191

UNITED STATES PATENT OFFICE.

HARRY POVEY, OF STANMORE, AND HALDANE OSWALD HALLAS, OF LONDON, ENGLAND, ASSIGNORS TO COLLOIDAL EQUIPMENT CORPORATION, OF NEW YORK, N. Y., A CORPORATION OF NEW JERSEY.

MACHINE FOR DISINTEGRATING AND EMULSIFYING MATERIALS.

Original No. 1,489,786, dated April 8, 1924, Serial No. 655,542, filed August 3, 1923. Application for reissue filed August 11, 1925. Serial No. 49,627.

*To all whom it may concern:*

Be it known that we, HARRY POVEY and HALDANE OSWALD HALLAS, both subjects of the King of Great Britain, residing at Stanmore, Middlesex, England, and London, England, respectively, have invented certain new and useful Improvements in Machines for Disintegrating and Emulsifying Materials, of which the following is a specification.

Our invention relates to machines for disintegrating solid material in the presence of a liquid and also for the emulsification or admixture of liquids.

Our invention has for its object to provide an improved machine in which the disintegration, emulsification or admixture of materials may be effected in a more efficient manner than has up to the present been attainable.

Our invention consists in the improved disintegrating, emulsifying or admixing machines to be hereinafter described.

Figure 1:
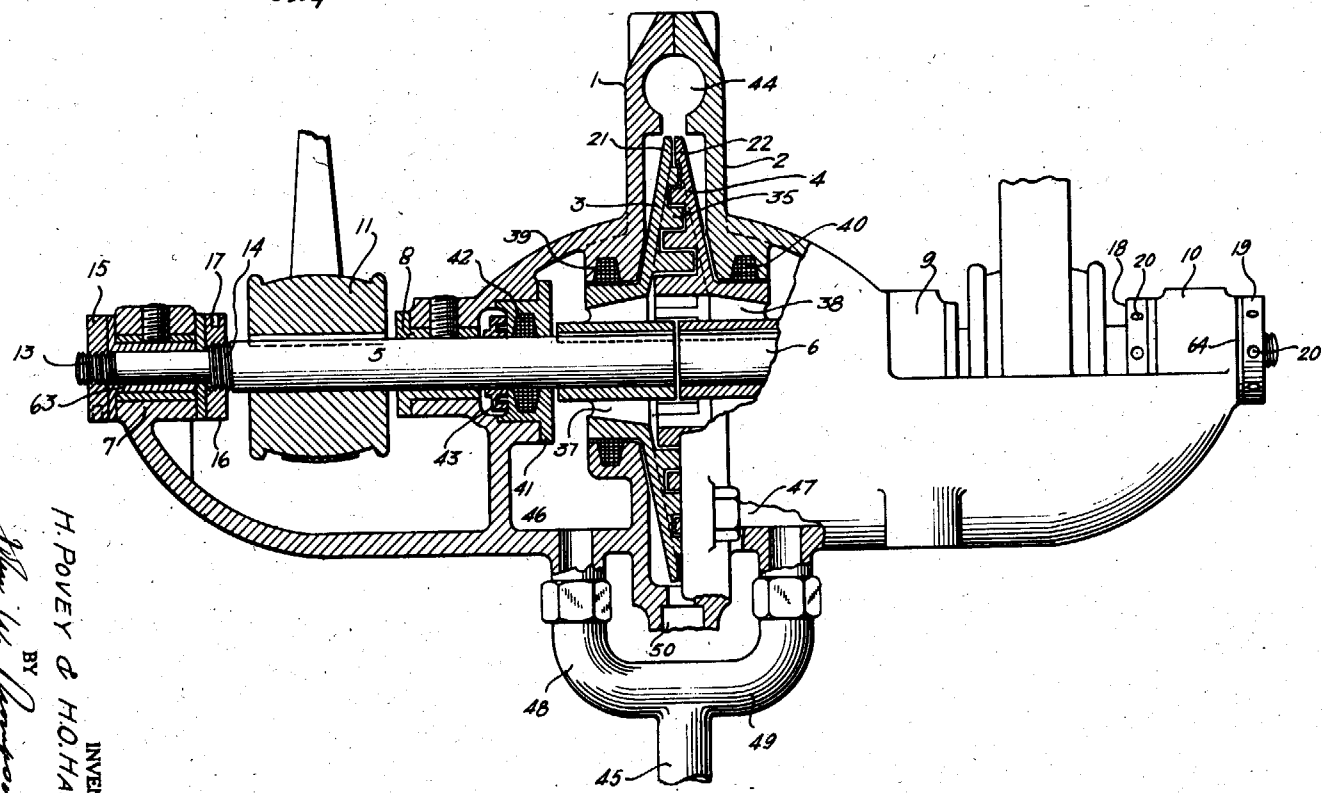
Figure 2:
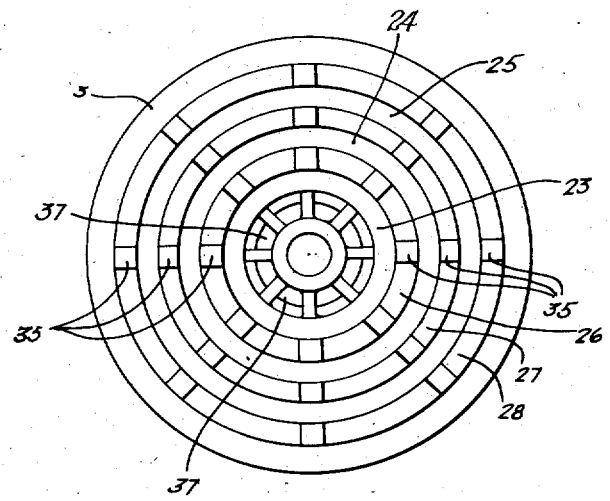
Figure 3:
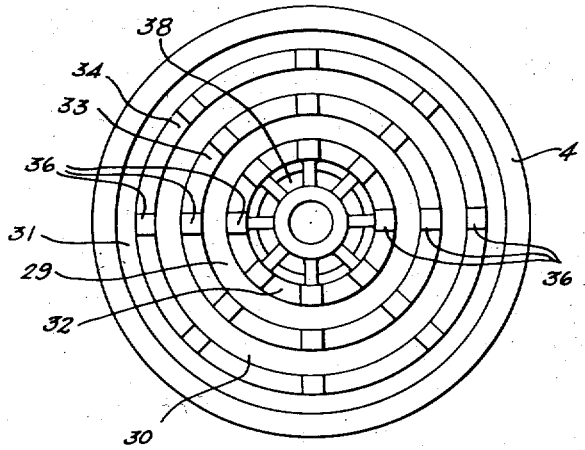
Figure 4:
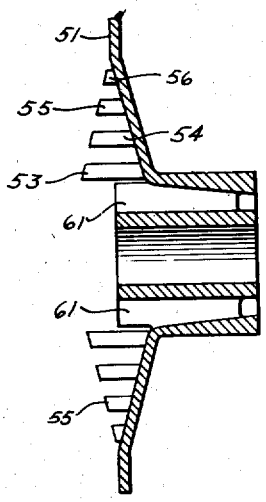
Figure 5:
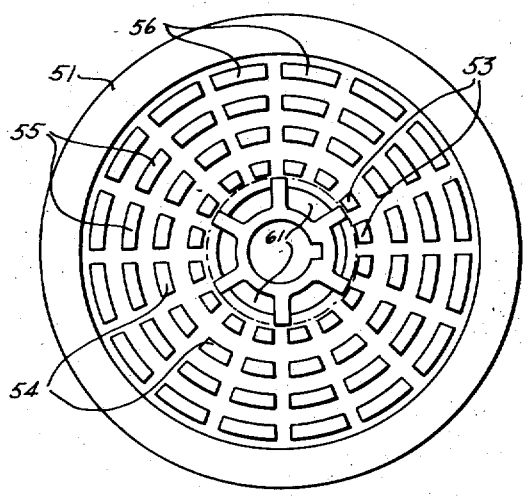
Figure 6:
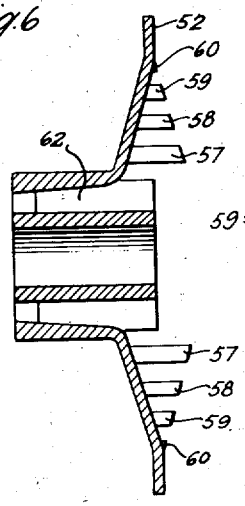
Figure 7:
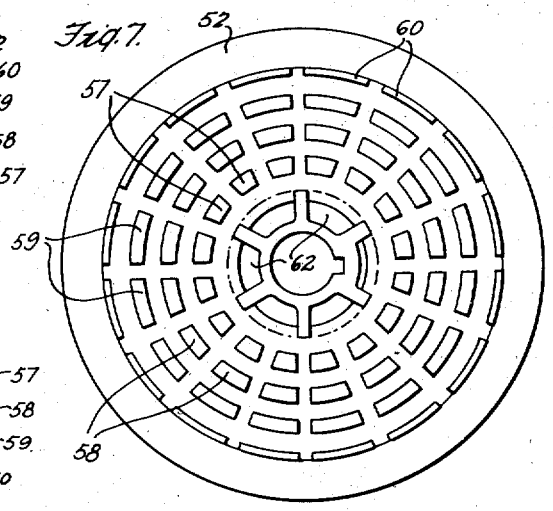

Referring now to the accompanying drawings, which illustrate our invention, and form part of our specification, Figure 1 shows a part sectional elevation of one form of machine constructed according to our invention, while Figures 2 and 3 show front elevations of the oppositely rotating members shown in Figure 1.

Figures 4, 5, 6 and 7, show sectional and front elevations alternately of modified forms of oppositely rotating members.

In carrying our invention into effect according to one form, a casing formed of two similar portions 1 and 2, is constructed and assembled as shown in Figure 1.

In this casing members 3 and 4 arranged to rotate in opposite directions, are mounted the member 3 being mounted on the shaft 5 and the member 4 on the shaft 6.

The shaft 5 is rotatably mounted on bearings 7 and 8, integrally formed with the casing while the shaft 6 is similarly mounted on the bearings 9 and 10.

Between the bearings 7 and 8, a pulley 11 is rigidly attached to the shaft 5, while a pulley 12 is similarly mounted on the shaft 6, between the bearings 9 and 10.

In the bearing 7 the shaft 5 is of reduced diameter and has a threaded portion 13 formed at its outer end, while a second threaded portion 14 is also formed on the shaft 5, in proximity to the inner face of the bearing. With these threaded portions circular nuts 15 and 16 engage, the nuts being provided with spaced holes 17 on their peripheries for manipulating purposes.

The shaft 6 is similarly formed, and is provided with nuts 18 and 19 which have holes 20 formed on their peripheries.

By manipulating the nuts 13, 16 and 18, 19, the position of the shafts 5 and 6 in the flanged sleeves 63 and 64 and consequently that of the members 3 and 4 may be adjusted relatively to one another longitudinally in order to obtain the desired clearance between the flanged portions 21 and 22 of the members, and also between the ends of the blades thereon as will be hereinafter described.

We will now describe one form of oppositely rotating members which we have found efficient in practice.

In the face of the member 3, Figures 2 and 3, we form a number of annular grooves 23, 24 and 25 with alternate annular projections 26, 27 and 28 while on the member 4 corresponding grooves 29, 30 and 31 with projections 32, 33 and 34 are similarly formed.

On the projections 26, 27 and 28 on the member 3, Figure 2, a number of axially disposed blades 35 are formed.

The projections 32, 33 and 34 on the member 4 have likewise axially disposed blades 36 formed thereon.

Co-axial with the shafts 5 and 6 a number of ducts 37 and 38 respectively are formed for leading the material to the operative faces of the members 3 and 4. Between the members 3 and 4 and the portions 1 and 2 of the casing, packing rings 39 and 40 are disposed to prevent leakage of the material between these parts.

A gland 41 carrying a packing ring 42, and a loose ring 43 are provided around the shaft 5, to prevent leakage of lubricating oil into the casing, a similar arrangement, not shown, being provided around the shaft 6.

The flanged portions 21 and 22 of the members 3 and 4 are spaced apart to form a narrow annular duct through which the material is projected, after treatment by the blades, into a peripheral collecting channel 44, formed in the casing.

The material is supplied to the casing through the pipe 45 and is led to the chambers 46 and 47 therein by the branches 48 and 49.

The material is fed to the pipe 45 from a gravity tank, and after being treated is discharged from the casing through the pipe 50.

In operation, the material to be treated is led through the branch pipes 48 and 49 into the chambers 46 and 47, from which it passes through the axial ducts 37 and 38.

The streams of material from these ducts impinge upon one another, and are forced outwards by centrifugal force, assisted by the head in the case of gravity feed, through the bladed portions of the members 3 and 4, in which the material is beaten, stirred and sheared and the state of division of the solids therein reduced.

The materials are thereafter ejected through the annular duct between the flanged portions 21 and 22, where a further reduction is effected, into the peripheral chamber 44, and are finally discharged through the outlet 50.

In a machine constructed as above described operating with a mixture of milk powder and water and having oppositely rotating members of 6½ inches in diameter running at 3000 revolutions per minute, 3 gallons per minute of treated fluid may be obtained with an expenditure of 3 horse power, the material being passed only once through the machine.

The end and radial clearances of the blades in the above machine were approximately $\frac{1}{64}$ of an inch while the width of the annular duct between the members external to the blades was approximately .03 of an inch.

The solids in the treated fluid were reduced to a degree of division which showed no precipitation or sign of settling out after several weeks' observation and under the microscope exhibited Brownian movements.

In some cases, we may modify the construction of the oppositely running members and arrange a greater number of blades thereon. In Figures 4 to 7 we have shown an example of such a modification in which a pair of rotating members 51 and 52 have four rings of blades 53, 54, 55, 56 and 57, 58, 59, 60 respectively, with sixteen blades on each ring. The blades in this case are not formed on annular projections, as in the previous examples, but directly on the face of the oppositely rotating members. Axial ducts 61 and 62, as before, are arranged on the rotating members, for the introduction of the material.

In some cases we may modify the construction of the machine shown in Figure 1, and arrange a single rotating bladed member only in the casing. This member is formed in a similar manner to those above described, the blades thereon intermeshing with corresponding blades on the casing. A narrow annular duct extends outside the bladed sections between the rotating member and the casing, and discharges the treated material as before into a peripheral chamber.

The speed of the rotating members, the end clearance between the intermeshing bladed sections and the form and arrangement of the blades as well as the width of the annular duct may be varied as desired, or in accordance with the materials being treated.

Although we have described our invention as operating with a mixture of milk powder and water its use is not limited to this application as it may also be used for the disintegration of china clay, barytes and other substances in the presence of a liquid and also for the emulsification or intimate admixture of two or more liquids.

In some cases owing to the nature of the materials being treated it may be necessary to pass them two or more times through the machine to reduce them to the state of division indicated above.

When applying our invention to the emulsification or admixture of two liquids, one of the liquids may be introduced through the axial duct in one of the rotating members, in the machine illustrated in Figure 1, and the other liquid through the axial duct in the other rotating member.

By means of our invention the disintegration, emulsification or admixture of materials may be performed in an exceedingly efficient manner and solid materials when treated along with a liquid may be reduced to a state of division approaching the colloidal so that it remains in suspension for several weeks.

We wish it to be understood that the above examples of our invention are simply to be regarded as typical only, and not as in any way restricting our invention thereto, as modifications may be made therein without departing beyond the scope of our invention.

We claim:

1. In a disintegrating, emulsifying, or admixing machine, a casing, relatively rotatable members mounted in the casing and having their proximate faces formed with relatively spaced blades and their edges beyond the blades defining a narrow discharge channel, the discharge channel being of less width than the space between the blades, feeding means for delivering material into the casing beyond each of the respective members, and means formed in said members for delivering the material from the casing axially of the members and adjacent their centres of rotation.

2. In a disintegrating, emulsifying or admixing machine, a casing, aligned driven shafts mounted in the casing, a member fixed on the inner end of each shaft, the proximate faces of the members being formed with relatively spaced blades and beyond such blades to define a narrow discharge channel, inlets formed in each member adjacent to and surrounding the shaft, and means for delivering material to the casing beyond the inlets of each member.

3. In a disintegrating, emulsifying or admixing machine, a casing, aligned driven shafts mounted in the casing, a member fixed on the inner end of each shaft, the proximate faces of the members being formed with relatively spaced blades and beyond such blades to define a narrow discharge channel, inlets formed in each member adjacent to and surrounding the shaft, and means for delivering material to the casing beyond the inlets of each member, said casing being formed with a receiving channel in line with and beyond the discharge channel of the members, and an outlet leading from such channels.

4. In a disintegrating, emulsifying or admixing machine, the combination of opposed material treating members each having a blade presenting portion and an edge portion, said edge portions defining between them a discharge passage of less width than the space between said blade presenting portions, means extending through each of said members and co-axial therewith for delivering material between the effective material treating portions thereof, and means for effecting relative rotation of one of said members with respect to the other.

5. In a disintegrating, emulsifying or admixing machine, the combination of opposed material treating members each having a blade presenting portion and an edge portion, said edge portions defining between them a discharge passage of less width than the space between said blade presenting portions, means extending through each of said members and co-axial therewith for delivering material between the effective material treating portions thereof, means for effecting relative rotation of one of said members with respect to the other, and a product receiving casing enclosing the peripheral opening of said discharge passage.

6. In a disintegrating, emulsifying or admixing machine, the combination of opposed material treating members each having a blade presenting portion and an edge portion, said edge portions defining between them a discharge passage of less width than the space between said blade presenting portions, a casing enclosing said members and having a collecting channel positioned to receive material discharged through said discharge passage, said collecting channel having a constricted opening between a portion of its interior and the peripheral opening of said discharge passage.

7. In a disintegrating, emulsifying or admixing machine, the combination of opposed material treating members each having a blade presenting portion and an edge portion, said edge portions defining between them a constricted discharge passage, a shaft for each member, and a feed duct formed in each member adjacent to and surrounding the shaft thereof.

In testimony whereof, we have signed our names to this specification this 10 day of July 1925.

HARRY POVEY.
HALDANE OSWALD HALLAS.